(12) United States Patent
Porter et al.

(10) Patent No.: US 10,817,732 B2
(45) Date of Patent: Oct. 27, 2020

(54) AUTOMATED ASSESSMENT OF COLLISION RISK BASED ON COMPUTER VISION

(71) Applicant: Trimble Inc., Sunnyvale, CA (US)

(72) Inventors: Miles Porter, Plymouth, MN (US); Anne Hunt, Maple Grove, MN (US)

(73) Assignee: Trimble Inc., Sunnyvale, CA (US)

( * ) Notice: Subject to any disclaimer, the term of this patent is extended or adjusted under 35 U.S.C. 154(b) by 34 days.

(21) Appl. No.: 16/227,934

(22) Filed: Dec. 20, 2018

(65) Prior Publication Data

US 2020/0202144 A1 Jun. 25, 2020

(51) Int. Cl.
*G06N 20/00* (2019.01)
*G06N 3/08* (2006.01)
*G06K 9/00* (2006.01)
*G06K 9/46* (2006.01)
*G06K 9/62* (2006.01)

(52) U.S. Cl.
CPC ........... *G06K 9/00805* (2013.01); *G06K 9/46* (2013.01); *G06K 9/6262* (2013.01); *G06N 3/08* (2013.01); *G06N 20/00* (2019.01)

(58) Field of Classification Search
CPC combination set(s) only.
See application file for complete search history.

(56) References Cited

U.S. PATENT DOCUMENTS 5,467,283 A 11/1995 Butsuen et al.
10,486,485 B1 * 11/2019 Levinson .......... B60W 50/0098

2007/0030131 A1 2/2007 Takahama et al.
2014/0136414 A1 * 5/2014 Abhyanker ............ G05D 1/024
    705/44
2014/0180914 A1 * 6/2014 Abhyanker .......... G06Q 10/087
    705/39
2014/0201126 A1 * 7/2014 Zadeh .................... A61B 5/165
    706/52
2015/0341599 A1 * 11/2015 Carey ................ G06K 9/00342
    348/150
2017/0177937 A1 * 6/2017 Harmsen ................ G05D 1/101
    (Continued)

OTHER PUBLICATIONS

International Search Report and Written Opinion for Application No. PCT/US2019/064515, dated Mar. 19, 2020, 16 pages.
(Continued)

*Primary Examiner* — Omar S Ismail
(74) *Attorney, Agent, or Firm* — Kilpatrick Townsend & Stockton LLP

(57) ABSTRACT

An image may be obtained from one or more cameras coupled to a first vehicle. The image may be provided as input to a machine learning algorithm configured to determine whether an object depicted in the image corresponds to another vehicle and to determine size information and location information for the object. Output from the machine learning algorithm enables obtaining features including size and location information for a second vehicle that is identified in the image. The features may be used to determine whether the second vehicle is depicted within a predetermined region of the image including a predicted travel path of the first vehicle. The features may also be used to determine whether the second vehicle is within a predetermined proximity of the first vehicle. Thereafter, a determination may be generated as to whether there is a significant risk of collision between the first vehicle and the second vehicle.

18 Claims, 5 Drawing Sheets

(56) References Cited

U.S. PATENT DOCUMENTS

| | | | | |
|---|---|---|---|---|
| 2018/0060725 | A1* | 3/2018 | Groh | G06N 7/005 |
| 2018/0075309 | A1* | 3/2018 | Sathyanarayana | G06N 7/005 |
| 2018/0204111 | A1* | 7/2018 | Zadeh | G06K 9/00281 |
| 2018/0300964 | A1* | 10/2018 | Lakshamanan | B60W 30/00 |
| 2019/0232964 | A1* | 8/2019 | Lindholm | G06T 7/50 |
| 2019/0370571 | A1* | 12/2019 | Shin | G06K 9/00805 |
| 2020/0139960 | A1* | 5/2020 | Newman | B60Q 9/008 |

OTHER PUBLICATIONS

Truong, Q. B. et al., "Vehicle Detection Algorithm Using Hypothesis Generation and Verification," Sep. 16, 2009, Emerging Intelligent Computing Technology and Applications, Springer, pp. 534-543, XP019140666.

Han, F. et al., "A Two-Stage Approach to People and Vehicle Detection with HOG-Based SVM," Internet Citation, Jan. 1, 2006, XP009127403, retrieved from the Internet: http://www.isd.mel.nist.gov/PerMIS_2006/proceedings/PerMIS_papers/SS1/PerMIS06.Final_SS1-1-Han.pdf.

* cited by examiner

AUTOMATED ASSESSMENT OF COLLISION RISK BASED ON COMPUTER VISION

BACKGROUND

Recent developments in automotive safety involve the use of various sensors for determining situations in which there is a significant risk of collision with another vehicle. In particular, light detection and ranging (lidar) and radar sensors have become popular devices for determining such situations. However, systems employing such sensors can yield false positives. One reason for this is the difficulty of discriminating by types and locations of objects when using such sensors. For example, lidar or radar sensors may cause false alarms based on detecting roadway signs or vehicles traveling on the opposite side of the road.

SUMMARY

The present disclosure relates generally to computer vision. More particularly, techniques are described for automated assessment of collision risk based on computer vision. Various embodiments are described herein, including methods performed by one or more computing devices, non-transitory computer-readable media storing instructions executable by one or more processors, and systems comprising one or more processors and one or more non-transitory computer-readable media.

An image may be obtained from one or more cameras coupled to a first vehicle. The image may be provided as input to a first machine learning algorithm. In some embodiments, prior to providing the image as input to the first machine learning algorithm, the image may be obtained from the one or more cameras responsive to one or more non-camera sensors detecting an object outside the first vehicle.

The first machine learning algorithm may be configured to determine whether or not the object depicted in the image corresponds to another vehicle and to determine size information and location information for the object. The first machine learning algorithm may be performed using a convolutional neural network.

A set of features may be obtained based on output from the first machine learning algorithm. The set of features may include size information and location information for a second vehicle that is identified in the image. The size information may comprise one or more dimension values of a bounding box that includes the second vehicle. The location information may comprise a pair of coordinates corresponding to an approximate center of a bounding box that includes the second vehicle.

The set of features may be used to determine whether or not the second vehicle is depicted within a predetermined region of the image. The predetermined region may include a predicted travel path of the first vehicle. In some embodiments, the predetermined region may have a triangular shape. Furthermore, the set of features may be used to determine whether or not the second vehicle is within a predetermined proximity of the first vehicle.

Based on determining whether or not the second vehicle is depicted within the predetermined region and based on determining whether or not the second vehicle is within the predetermined proximity, a first determination may be generated. The first determination may indicate whether or not there is a significant risk of collision between the first vehicle and the second vehicle.

In some embodiments, after obtaining the set of features based on the output from the first machine learning algorithm, the set of features may be provided as input to a second machine learning algorithm configured to generate a second determination as to whether or not there is a significant risk of collision between the first vehicle and the second vehicle. The second determination may be obtained as output from the second machine learning algorithm, and an ensembling process may be performed on the first determination and the second determination to determine whether or not there is a significant risk of collision between the first vehicle and the second vehicle.

DETAILED DESCRIPTION

Figure 1A:
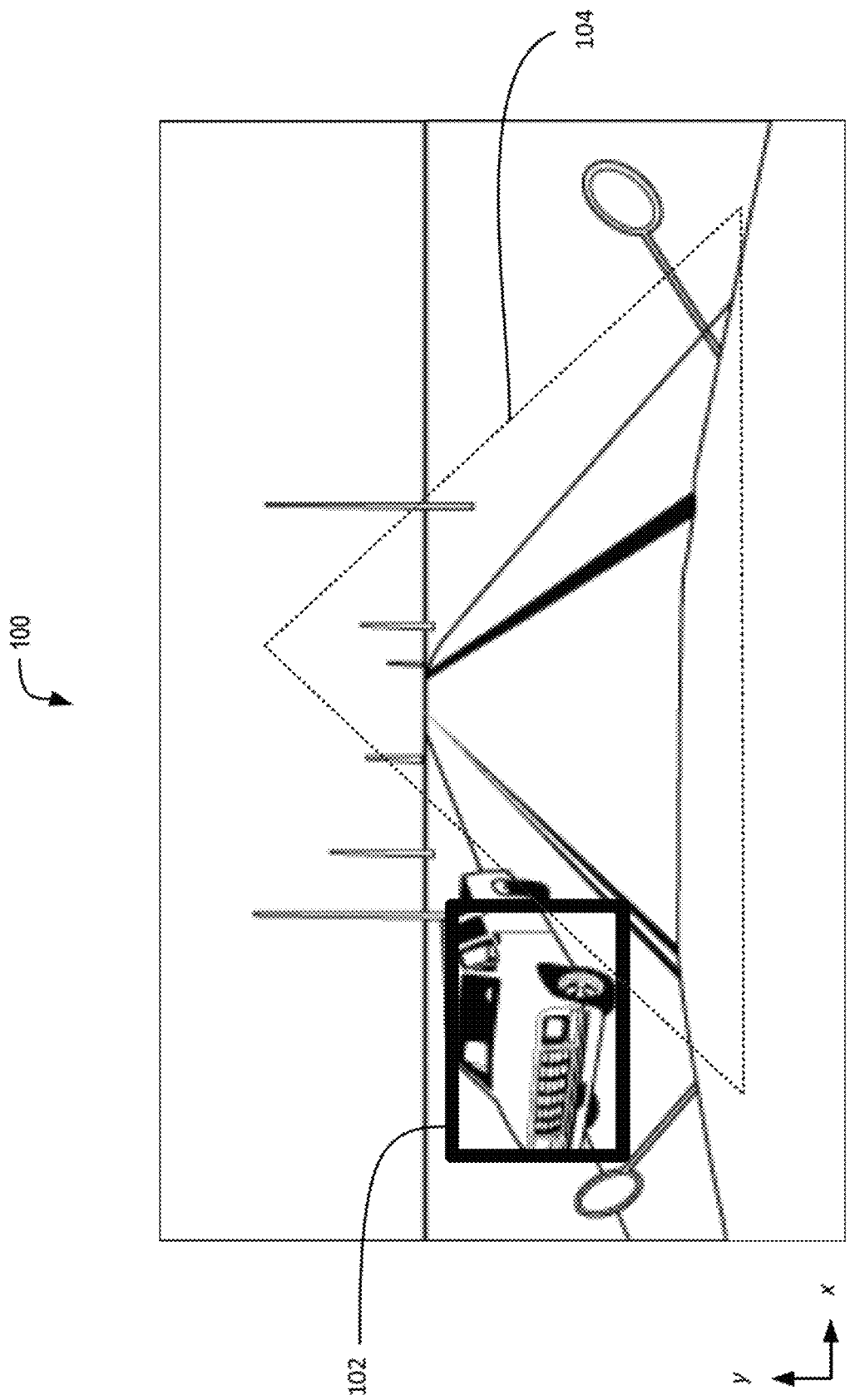
FIGS. 1A-B depict example images that are processed to assess collision risk.

In the following description, specific details are set forth in order to provide a thorough understanding of certain embodiments. However, it will be apparent that various embodiments may be practiced without these specific details. In particular, the figures and associated description are not intended to be restrictive. One of ordinary skill in the art would recognize many possible variations, alternatives, and modifications. For example, some embodiments may comprise more systems or components than those shown in the figures, fewer systems or components than those shown in the figures (e.g., two or more systems of the figures may be combined), or some other configuration or arrangement of systems.

Disclosed herein are techniques related to automated assessment of collision risk based on computer vision. Computer vision can be used to discriminate by types and locations of objects, thereby reducing the incidence of false positives. This can be achieved by processing images using a machine learning algorithm. However, to reduce the amount of training data that may otherwise be involved, collision risk may not be assessed using the machine learning algorithm alone. Rather, collision risk may be assessed using the machine learning algorithm in combination with one or more other algorithms, each of which may or may not involve machine learning.

For example, automated assessment of collision risk may be performed in multiple stages based on processing an image/video frame captured at a camera-equipped vehicle. In a first stage, a machine learning algorithm may be used to identify an object in the image/video frame. The machine learning algorithm may also determine location and size information for the object. In a second stage, another algorithm may be used to determine, based on the location information, whether the object is located in a predicted travel path of the camera-equipped vehicle. This algorithm may also be used to determine, based on the size information, whether the object is located within dangerous proximity of the camera-equipped vehicle. Determining that the object is located in the predicted travel path and within dangerous proximity of the camera-equipped vehicle enables generating a determination that there is a significant collision risk between the object and the camera-equipped vehicle.

As mentioned above, a collision risk is referred to herein as "significant" if certain conditions are satisfied. At a minimum, these conditions include determining that an object of interest is located within a predicted travel path and within dangerous proximity of a camera-equipped vehicle. Determining that the object is located within the predicted travel path of the camera-equipped vehicle may involve comparing location information for the object with location information for the predicted travel path. Determining that the object is located within dangerous proximity of the camera-equipped vehicle may involve comparing size information for the object with a predetermined threshold value. Location and size information are described in greater detail below.

Example Processed Images

FIG. 1A depicts an image 100 that is processed using computer vision. Unless clearly indicated otherwise, the terms "video frame" and "image" are used interchangeably herein. Thus, in some embodiments, image 100 may be a frame of a video captured by one or more cameras coupled to a vehicle (e.g., a car, a pick-up truck, a semi-trailer truck, a van, a boat, or an airplane). This vehicle is referred to herein as a "camera-equipped vehicle".

At the bottom of image 100, the front portion of a camera-equipped vehicle is depicted. Image 100 depicts the camera-equipped vehicle traveling on the right-hand side of a road. Furthermore, image 100 depicts another vehicle traveling in the opposite direction on the left-hand side of the road. Although there is a negligible risk of collision between the vehicles, it is difficult to use lidar or radar sensors to correctly assess risk. As mentioned above, it is difficult, if not impossible, to discriminate by types and locations of objects when using lidar and radar sensors.

However, computer vision enables discrimination by types and locations of objects. For example, object classification may be performed to discriminate by object type, and object localization may be performed to discriminate by object location.

Object classification may involve determining whether an image includes a depiction of a particular type of object. For example, object classification may be performed to determine whether an image depicts a vehicle in an environment external to the camera-equipped vehicle. Such a vehicle is referred to herein as an "external vehicle".

Object localization may involve determining location and size information for an object depicted in an image. For example, the location information may comprise coordinates indicating a position of an object in an image. The size information may comprise one or more dimension values (e.g., a length value and/or a width value) computed based on the location information.

In some embodiments, object localization may involve generating a bounding box that includes at least part of an object's depiction. For example, in image 100, a depiction of an external vehicle is marked using a bounding box 102. Thus, location information for the depiction may comprise coordinates corresponding to an approximate center of the bounding box or coordinates corresponding to one or more vertices of the bounding box. Size information for the depiction may comprise one or more dimension values of the bounding box.

In some embodiments, segmentation techniques may be used to generate an outline of an object's depiction. Thus, location information for the depiction may comprise coordinates corresponding to an approximate center of the outline or coordinates comprising maximum and/or minimum points in the outline. Size information for the depiction may comprise one or more dimension values of the outline.

The results of performing object classification and object localization may be used to determine whether an image depicts a situation involving a significant risk of collision between the camera-equipped vehicle and an external vehicle. This may involve filtering out images that do not include a depiction of an external vehicle in a predicted travel path of the camera-equipped vehicle.

In some embodiments, the predicted travel path may correspond to a polygonal region of an image. The polygonal region may be statically or dynamically determined. For example, in image 100, a triangular image region 104 primarily includes the right-hand side of a straight stretch of road upon which the camera-equipped vehicle is expected to travel. In some embodiments, the boundaries of region 104 may be determined such that region 104 is universally applicable to straight and curved stretches of road. However, in some other embodiments, the boundaries of region 104 may adapt to the shape of the road.

Determining whether an external vehicle is located in the predicted travel path may involve comparing the external vehicle's location information with coordinates corresponding to the predicted travel path. For example, image 100 may be determined to depict an insignificant risk of collision, because region 104 excludes an approximate center of bounding box 102 and/or a majority of the vertices of bounding box 102.

Determining whether an image depicts a significant risk of collision may also involve estimating a proximity of an external vehicle with respect to the camera-equipped vehicle. This may be achieved based on using size information as an indication of proximity. The underlying principle is that, with some exceptions, objects closer to the camera-equipped vehicle tend to appear bigger in an image.

The size information may be compared to a predetermined threshold value. This comparison enables determining whether the external vehicle is located within dangerous proximity of the camera-equipped vehicle, thus posing a significant risk of collision. In some embodiments, the predetermined threshold value may vary according to location information. Thus, a large object depicted close to the camera-equipped vehicle may be evaluated differently from a similarly-sized object depicted far from the camera-equipped vehicle.

Figure 1B:
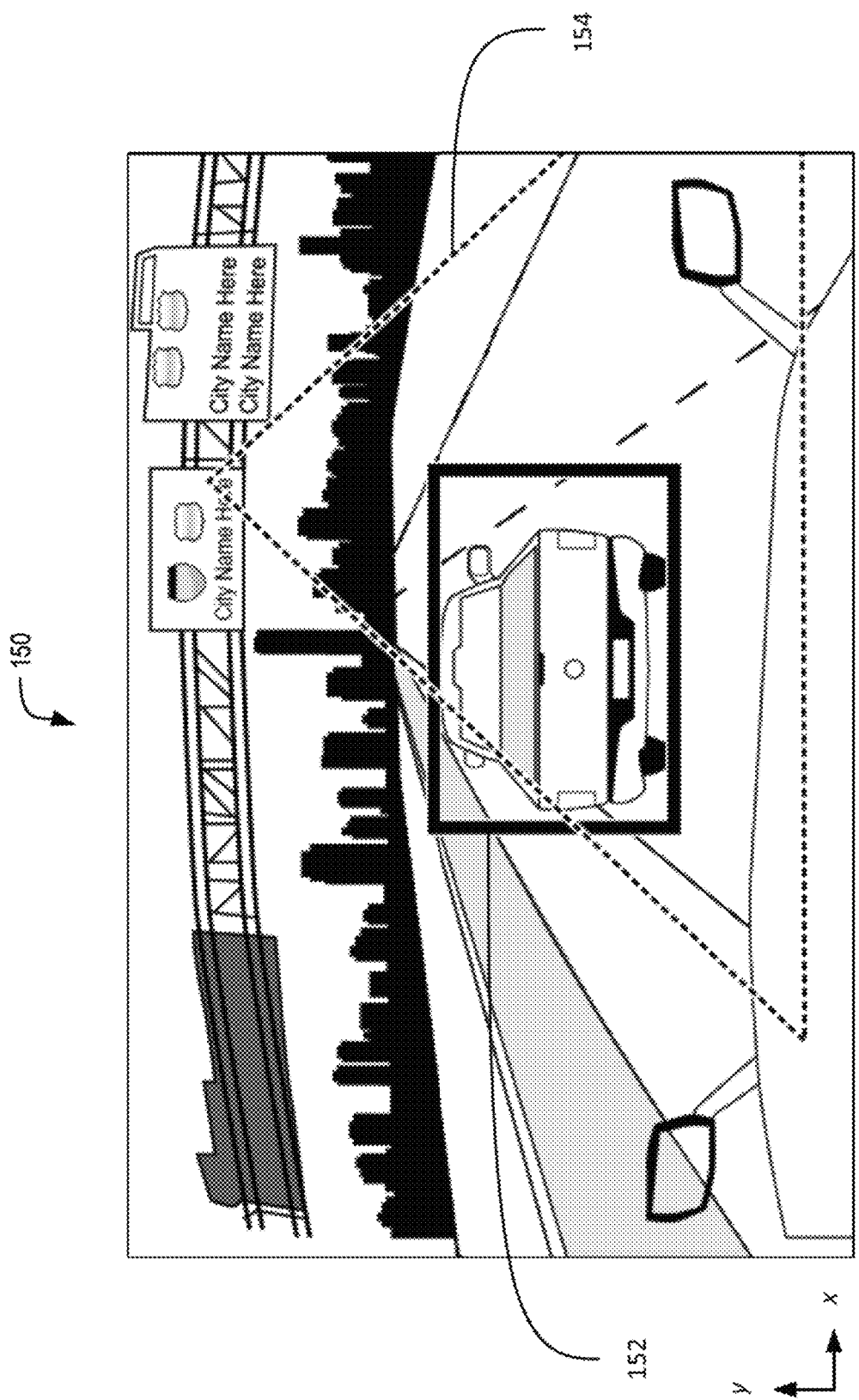

For example, FIG. 1B depicts an image 150 that includes a bounding box 152 and a region 154 that includes a predicted travel path of a camera-equipped vehicle. Since region 154 includes an approximate center and/or a majority of the vertices of bounding box 152, image 150 may undergo further processing to assess collision risk. The further processing may include using a y-coordinate of a point associated with bounding box 152 (e.g., the y-coordinate of the approximate center or a y-coordinate of a vertex) to perform a lookup operation in a table of predetermined threshold values. The table may correlate different y-coordinate values to different predetermined threshold values. Upon determining a predetermined threshold value for the y-coordinate, the predetermined threshold value may be compared to a width value for bounding box 152. If the width value exceeds the predetermined threshold value, image 150 may be determined to depict a significant risk of collision.

Any number of various consequences may result from determining that an image depicts a significant risk of collision. For example, the color of a bounding box/outline may be changed (e.g., from blue to red). As another example, the image may be tagged as depicting a significant risk of collision and stored for further analysis.

Example Computing Architecture

Figure 2:
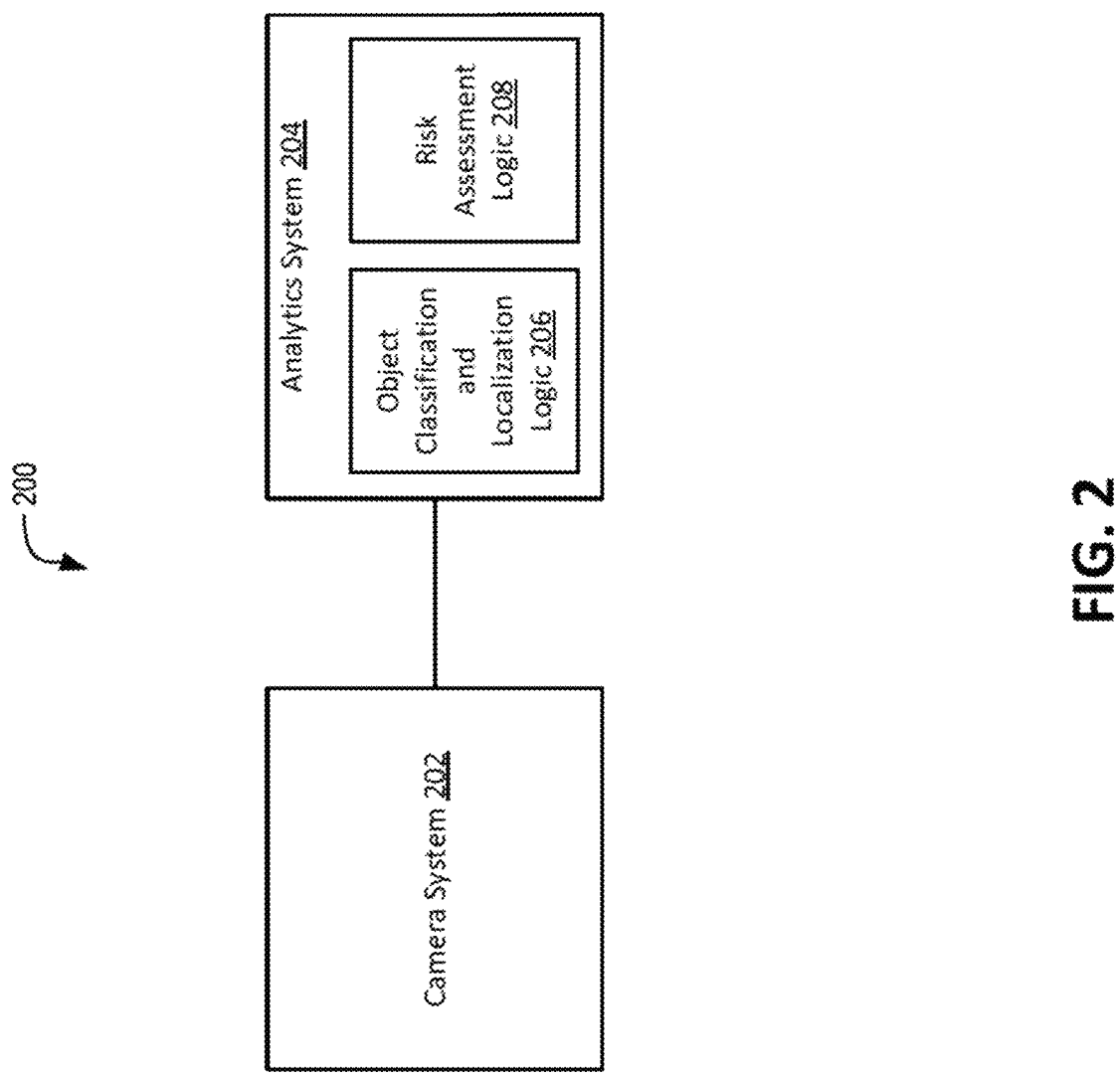
FIG. 2 is a block diagram depicting an example computing architecture.

FIG. 2 is a block diagram depicting an example computing architecture 200 that may be used to implement the techniques disclosed herein. Architecture 200 comprises a camera system 202 and an analytics system 204. Each system may comprise one or more processors and one or more non-transitory computer-readable media storing instructions executable by the one or more processors.

In the example of FIG. 2, camera system 202 and analytics system 204 are depicted as separate systems. For example, camera system 202 may be coupled to a vehicle, and analytics system 204 may be hosted in the cloud. As another example, camera system 202 and analytics system 204 may each be components of a larger vehicle system. However, in some embodiments, one system may be a component of the other system. For example, camera system 202 may be a component of analytics system 204.

Referring to FIG. 2, camera system 202 is communicatively coupled to analytics system 204. Any number of various communication networks may be used to facilitate communications between the systems. Example communication networks include, without limitation, the Internet, a wide area network (WAN), a local area network (LAN), a controller area network (CAN), a wired network, a wireless network, a Wireless Fidelity (WiFi) network, and/or a cellular network. For example, camera system 202 may communicate with cloud-hosted analytics system 204 via one or more communication networks comprising a wireless link. As another example, camera system 202 and analytics system 204 may be vehicle system components that communicate with each other via an in-vehicle communication network comprising a CAN bus.

Camera System

Camera system 202 may comprise one or more cameras (e.g., digital video cameras) communicatively coupled to a recording device (e.g., a digital video recorder). The one or more cameras may be configured to capture images and/or video in any number of directions relative to the camera-equipped vehicle (e.g., forward-facing, rear-facing, and/or side-facing). In some embodiments, the one or more cameras may be configured to continuously capture images and/or video for storage in non-volatile memory (e.g., a circular buffer) of the recording device. The recording device may comprise a communications interface (e.g., a wireless gateway) enabling communications between camera system 202 and analytics system 204. The communications may include transmissions of images and/or video captured by camera system 202.

In some embodiments, camera system 202 may continuously transmit images and/or video to analytics system 204. For example, images and/or video may be streamed to analytics system 204 from camera system 202.

In some embodiments, camera system 202 may transmit images and/or video to analytics system 204 responsive to one or more non-camera sensors (e.g., a lidar sensor, a radar sensor, an accelerometer, and/or a microphone) detecting one or more events indicative of a significant collision risk. Examples of such events include, without limitation, object detection, hard braking, and/or tire screeching. Thus, signals generated by the one or more non-camera sensors may be used to determine which images and/or which part of a video is to be transmitted to analytics system 204. In this manner, camera system 202 may serve to increase the accuracy of the one or more non-camera sensors in detecting a situation involving a significant risk of collision.

For example, a lidar or radar sensor may detect another vehicle within proximity of the camera-equipped vehicle and transmit a detection signal along the CAN bus. A wireless gateway device may listen for the detection signal in the CAN bus and cause a notification to be communicated to analytics system 204. Responsive to receiving the notification, analytics system 204 may communicate a request to camera system 202 for images and/or video corresponding to a predetermined timeframe around the time of the notification (e.g., a twenty-second timeframe including ten seconds before and after the time of the notification). Camera system 202 may then communicate the images and/or video to analytics system 204 via the wireless gateway device. Upon pulling the images and/or video from camera system 202, analytics system 204 may store the images and/or video. Analytics system 204 may also generate a notification that images and/or video have been received.

Analytics System

Analytics system 204 may comprise one or more computing devices (e.g., server computers) configured to analyze the images and/or video captured by camera system 202. In some embodiments, video received by analytics system 204 may be separated into individual video frames/images. The images/video frames may be analyzed using at least two algorithms—object classification and localization logic 206 and risk assessment logic 208.

Object Classification and Localization Logic

Logic 206 may comprise instructions configured to identify an object depicted in an image. For example, logic 206 may be a machine learning algorithm configured to determine whether an image includes a depiction of a vehicle. This may be achieved using classifiers for identifying vehicles.

Furthermore, logic 206 may comprise instructions configured to determine location and size information for the object. For example, logic 206 may be a machine learning algorithm configured to generate a bounding box that includes the detected object. The machine learning algorithm may be further configured to compute coordinates corresponding to the bounding box as well as to compute one or more dimension values based on the coordinates.

The output of logic 206 may comprise numerical data corresponding to the attributes or properties of an object. Object attributes or properties are referred to herein as the "features" of an object. Example features include, without limitation, identification information, confidence information, location information, and size information. Identification information may indicate that a particular type of object (e.g., car, truck, person, stop sign, or stop light) has been identified. Confidence information may include an indication of the confidence with which an object has been identified (e.g., a probability that the object is correctly identified). Location information may indicate a relative position (e.g., one or more pairs of coordinates) of the object within an image. Size information may indicate a relative size (e.g., one or more dimension values) of the object within an image. Such features may be provided to logic 208 for further processing.

As indicated above, logic 206 may be a machine learning algorithm employing classifiers for detecting one or more types of objects. However, engineering such classifiers is a difficult process that is typically performed manually. To avoid the difficult process of manually engineering classifiers, in some embodiments, a convolutional neural network (CNN) may be used to develop such classifiers in an automated manner.

For example, a deep neural network may be trained to identify one or more types of objects in an image. Deep learning may involve repeated exposure to training data. On each exposure, the deep neural network may be adjusted to reduce the error between its output and a desired output. Human feedback can be used to further tune the deep neural network. Once trained, the deep neural network may provide output that can be translated into a list of objects that have been identified in an image. For each object in the list, the deep neural network may also provide output that can be translated into an indication of the confidence with which the object is identified. To illustrate, an example output of the deep neural network may include a list of numbers that can be translated into the following features: "car(0.65)"; "truck(0.94)"; "person(0.04)"; "stop sign (0.21)".

In some embodiments, a CNN (e.g., the CNN mentioned above) may also be used to determine location information indicating a relative location of an object in an image. To illustrate, an example output of the CNN may include a list of numbers that can be translated into the features "car (0.65), (341, 879), (520, 1168)" where the second and third sets of parentheses include x and y coordinates corresponding to diagonal vertices of a bounding box that includes a depiction of a car.

In some embodiments, a CNN (e.g., any of the CNNs mentioned above) may also be used to determine size information indicating a relative size of an object in an image. To illustrate, an example output of the CNN may include a list of numbers that can be translated into the features "car(0.65), (341, 879), (520, 1168), 179" where the last number corresponds to a width value of a bounding box that includes a depiction of a car.

Risk Assessment Logic

Logic 208 may comprise instructions configured to generate, based on the output of logic 206, a determination as to whether an object depicted in an image presents a significant risk of collision with the camera-equipped vehicle. Generating the determination may involve analysis of one or more features obtained based on output from logic 206.

Identification information may be used to determine whether an object is of one or more particular types. The one or more particular types may encompass objects for which collision with the camera-equipped vehicle is to be avoided.

For example, logic 208 may comprise instructions configured to assess the risk of collision with other vehicles only. Thus, objects not identified as vehicles (e.g., objects identified as signage) may be determined to present an insignificant risk of collision. However, objects identified as cars or trucks, for example, may be subjected to further processing for determining whether the objects pose a significant risk of collision. The further processing may involve analysis of one or more other features.

Confidence information may be used to assess the reliability of the identification information. This may involve comparing the confidence information to a predetermined threshold value.

For example, confidence information may include a probability that an object is correctly identified as a vehicle, and logic 108 may compare the probability to a predetermined threshold value of probability. If the probability is less than the predetermined threshold value, the object may be determined to present an insignificant risk of collision. However, if the probability is greater than or equal to the predetermined threshold value, the object may be subjected to further processing for determining whether the objects pose a significant risk of collision. The further processing may involve analysis of one or more other features.

Location information may be used to determine whether an object is within a predicted travel path of the camera-equipped vehicle. As mentioned above, it may be assumed that the predicted travel path is included in a predetermined region (e.g., a polygonal region) of the image.

For example, location information may include coordinates corresponding to the vertices of a bounding box, and logic 208 may compare these coordinates with the coordinates of the predetermined region. If all/substantially all of the vertices are located outside the predetermined region, then the object included in the bounding box may be determined to present an insignificant risk of collision. However, if all/substantially all of the vertices are located inside the predetermined region, then the object included in the bounding box may be subjected to further processing for determining whether the objects pose a significant risk of collision. The further processing may involve analysis of one or more other features.

Size information may be used to determine whether an object is within dangerous proximity of the camera-equipped vehicle. This may involve comparing the size information to a predetermined threshold value of proximity.

For example, size information may include a width value for a bounding box, and logic 208 may compare the width value to a predetermined threshold value. If the width value is less than the predetermined threshold value, the object may be determined to present an insignificant risk of collision. However, if the width value is greater than or equal to the predetermined threshold value, the object may be determined to be within dangerous proximity of the camera-equipped vehicle and thus to present a significant risk of collision.

Any number of the features described above may be analyzed sequentially or concurrently. For example, the features may be analyzed in the order in which they are described above so that unnecessary processing is avoided. As another example, the features described above may be analyzed in parallel so that processing time is decreased.

In some embodiments, one or more other considerations may be used to determine whether an object presents an insignificant risk of collision. For example, a distorted depiction of an object (e.g., an unusually large depiction of the object caused by a water droplet) may contribute to an incorrect determination that the object presents a significant risk of collision. Thus, it may be necessary for a predetermined number of consecutive images to depict a situation involving a significant risk of collision before concluding that any of the images depicts a situation involving a significant risk of collision.

Upon making a determination that an object presents a significant risk of collision, any number of various actions may be performed. For example, images depicting situations involving a significant risk of collision may be tagged and stored such that they are accessible via a web application. The images may then be further analyzed by human beings and/or used for driver training purposes. As another example, analytics system 204 may communicate a notification indicating that a significant risk of collision has been detected.

Example Distributed Analytics System

Figure 3:
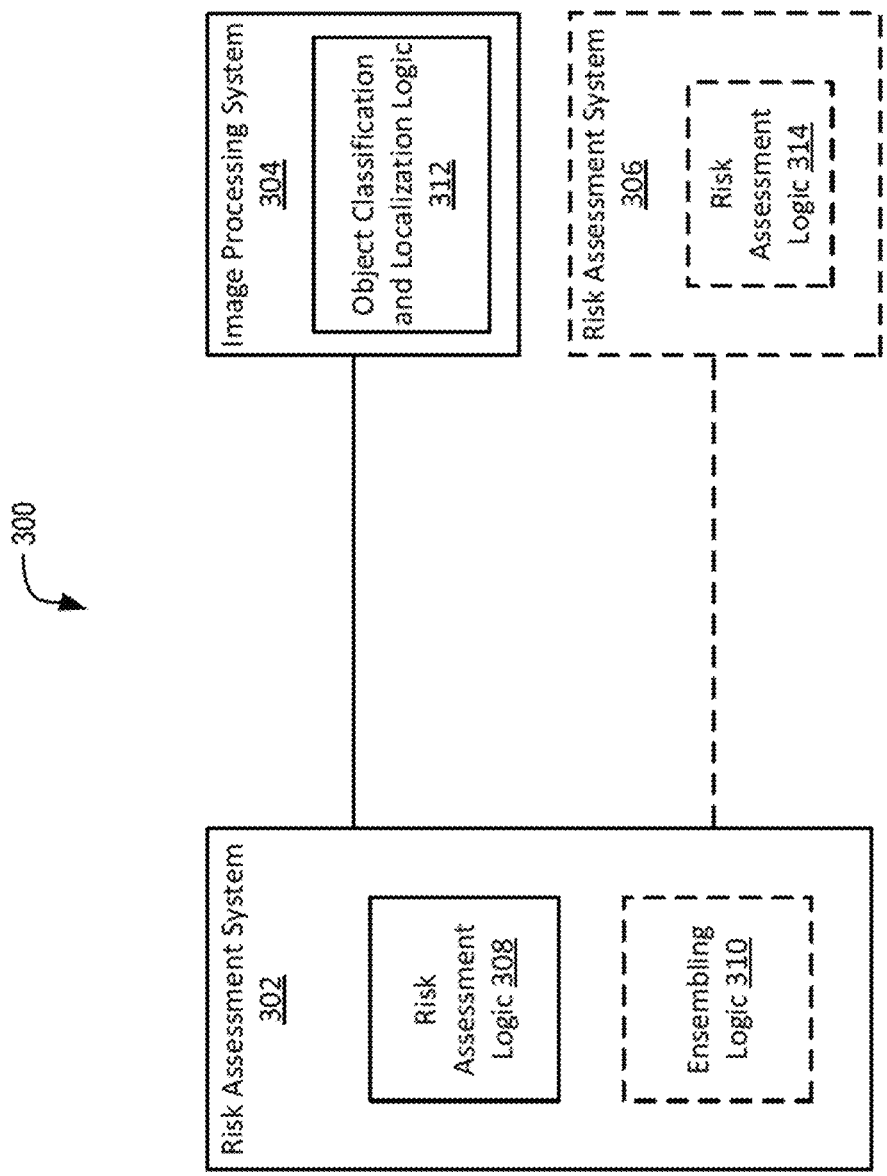
FIG. 3 is a block diagram depicting a detailed view of an example analytics system.

FIG. 3 is a block diagram depicting an example analytics system 300 comprising a risk assessment system 302 and an image processing system 304. In some embodiments, analytics system 300 may further comprise another risk assessment system 306.

Analytics system 300 may be similar to analytics system 204 of FIG. 2. Thus, object classification and localization logic 312 and risk assessment logic 308 may be similar to logics 206 and 208 of FIG. 2. However, in the example of FIG. 3, analytics system 300 is depicted as a distributed system in which risk assessment system 302 and image processing system 304 are separated by one or more communication networks.

Risk assessment system 302 may comprise one or more computing devices (e.g., server computers) that are configured to communicate images to image processing system 304. For example, risk assessment system 302 may receive images from camera system 202 and forward them to image processing system 304. As another example, risk assessment system 302 may receive video from camera system 202, separate the video into images, and provide the images to image processing system 304.

Image processing system 304 may comprise one or more computing devices (e.g., server computers) that are configured to output a set of features for an image based on executing logic 312. This may involve image processing system 304 translating the output of logic 312 into the set of features. In some embodiments, logic 312 may comprise a machine learning algorithm configured to determine identification, confidence, location, and/or size information for an object depicted in an image. In such embodiments, risk assessment system 302 may provide training data to image processing system 304.

Risk assessment system 302 may be further configured to receive the set of features from image processing system 304 and to execute logic 308 on the set of features. Logic 308 may comprise a static algorithm configured to generate a determination as to whether the set of features indicate a significant risk of collision. For example, this may involve the application of geometric formulas to determine whether an external vehicle is located within a predicted travel path of the camera-equipped vehicle and to determine whether an external vehicle is within dangerous proximity of the camera-equipped vehicle.

In some embodiments, risk assessment system 302 or image processing system 304 may be further configured to communicate the set of features to risk assessment system 306, which may be separated from risk assessment system 302 and/or image processing system 304 by one or more communication networks. Communication of the set of features to risk assessment system 306 may be performed at any time relative to risk assessment system 304 generating the determination as to whether the set of features indicate a significant risk of collision. For example, the set of features may be communicated to risk assessment system 306 in such a manner that enables the set of features to be analyzed concurrently by risk assessment systems 302 and 306.

Risk assessment system 306 may comprise one or more computing devices (e.g., server computers) that are configured to execute a risk assessment logic 314 on the set of features. Like logic 308, logic 314 may comprise instructions configured to generate a determination as to whether the set of features indicate a significant risk of collision. However, logic 314 may differ from logic 308 in that logic 314 may be a machine learning algorithm employing linear regression, logistic regression, decision trees, naïve Bayes, k-nearest neighbors, learning vector quantization, support vector machines, random forest, gradient boosting, and/or some other technique for generating a determination as to whether the set of features indicate a significant risk of collision. Risk assessment system 306 may communicate the generated determination to risk assessment system 302 for further processing.

In some embodiments, logic 314 may generate the determination based on one or more additional inputs. Example additional inputs include, without limitation, a speed of the camera-equipped vehicle, a heading of the camera-equipped vehicle, a geolocation of the camera-equipped vehicle, an indication of whether the camera-equipped vehicle is braking, an indication of whether the camera-equipped vehicle is operating under cruise control, a time of day at which the image was captured, an identification of the owner (e.g., a company) of the camera-equipped vehicle, an identification of the driver of the camera-equipped vehicle, a schedule (e.g., hours of service) of the driver of the camera-equipped vehicle, a make and model of the camera-equipped vehicle, an indication of whether the camera-equipped vehicle is changing lanes, an indication of whether the camera-equipped vehicle is experiencing a rollover or some other change in yaw, and a number of previous occurrences of collision warnings for the driver and/or the camera-equipped vehicle. Some of the additional inputs may be derived from signals generated by any number of various systems or devices (e.g., a global positioning system, an inertial measurement unit, a compass, a clock, and/or a database server computer).

Risk assessment system 302 may be further configured to execute an ensembling logic 310 on the determinations generated by logic 308 and logic 314. Logic 310 may comprise instructions configured to perform an ensembling process on the determinations generated by logic 308 and logic 314. Example ensembling processes include, without limitation, weighted voting, simple averaging, and weighted averaging. Thus, based on the determinations generated by logic 308 and logic 314, logic 310 may generate a final determination as to whether or not the set of features indicate a significant risk of collision.

Example Process

Figure 4:
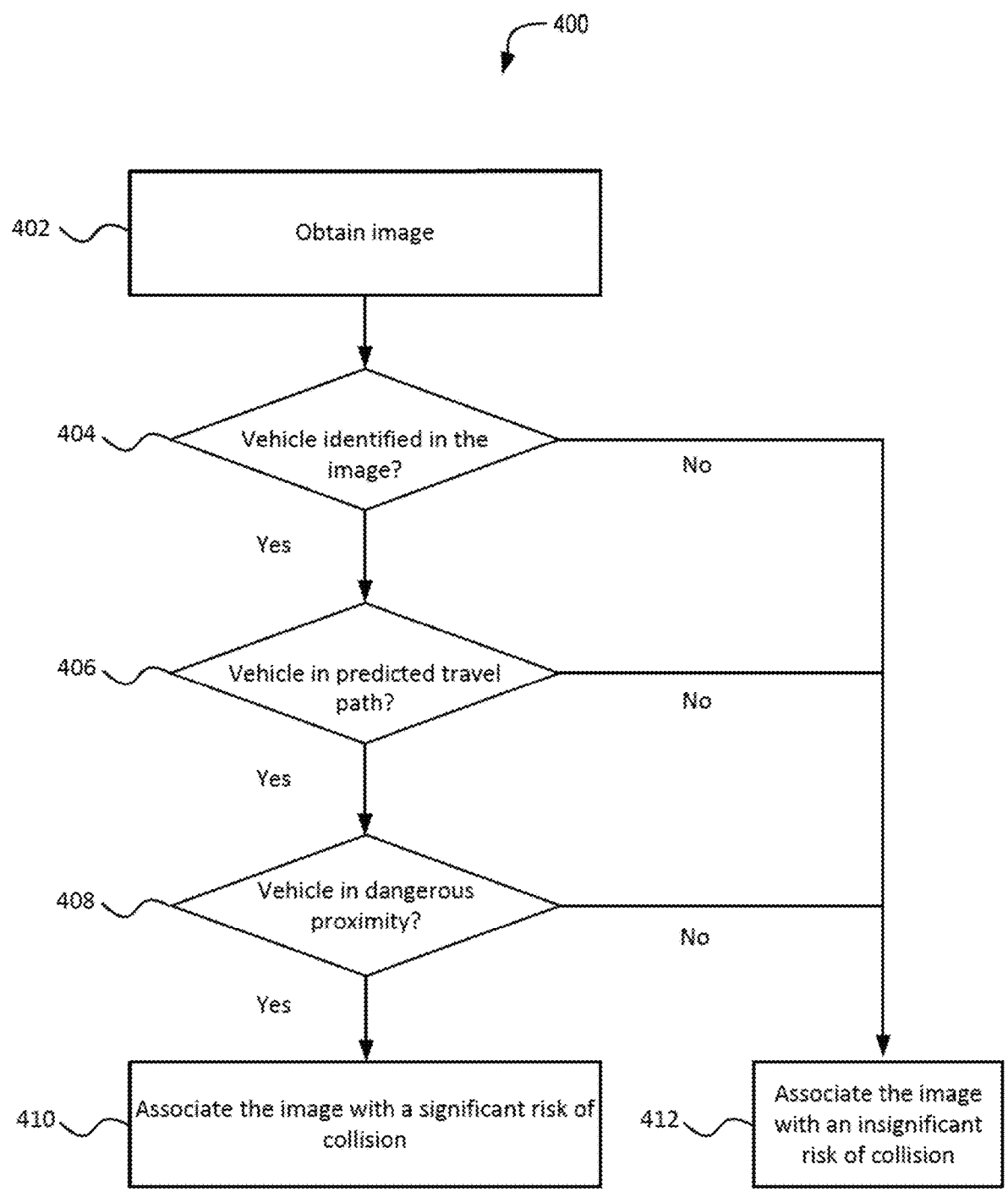
FIG. 4 is a flowchart depicting example processing for automated assessment of collision risk based on computer vision.

FIG. 4 is a flowchart depicting an example process 400 for automated assessment of collision risk based on computer vision. In some embodiments, process 400 may be performed by analytics system 204 and/or risk assessment system 302.

At 402, an image is obtained. The image may be captured at a camera-equipped vehicle. In some embodiments, the image may undergo further processing at the camera-equipped vehicle to determine whether the image depicts a situation involving a significant risk of collision. In some other embodiments, the image may undergo further processing at one or more computing devices that are remote from the camera-equipped vehicle.

At 404, a determination is made as to whether an external vehicle is identified in the image. This may be achieved based on using classifiers for identifying vehicles. In some embodiments, the classifiers may be automatically engineered using a CNN. If an external vehicle is identified in the image, the image is subjected to further processing at 406 to determine whether the image depicts a significant risk of collision. Otherwise, the image is associated with an insignificant risk of collision at 412.

At 406, a determination is made as to whether the external vehicle is located in a predicted travel path of the camera-equipped vehicle. This may involve comparing coordinates corresponding to the external vehicle with coordinates corresponding to the predicted travel path. If the external vehicle is located in the predicted travel path, the image is subjected to further processing at 408 to determine whether the image depicts a significant risk of collision. Otherwise, the image is associated with an insignificant risk of collision at 412.

At 408, a determination is made as to whether the external vehicle is located within dangerous proximity of the camera-equipped vehicle. This may involve comparing one or more dimensional values of the external vehicle with a predetermined threshold value. If the external vehicle is determined to be located within dangerous proximity, the image is subjected to further processing at 410. Otherwise, the image is associated with an insignificant risk of collision at 412.

At 410, the image is associated with a significant risk of collision. For example, the image may be tagged with an indication that it depicts a situation involving a significant risk of collision. In some embodiments, prior to 410, the image may undergo separate analysis using a machine learning configured to determine whether the image depicts a situation involving a significant risk of collision. The separate analysis may be used to corroborate or overrule the determinations made in 406 and 408.

As mentioned above, at 412, some images may be associated with an insignificant risk of collision. For example, such images may be discarded or otherwise prevented from undergoing further processing.

Although FIG. 4 depicts a particular sequence, it should be appreciated that some or all of process 400 may be performed in a different sequence. For example, the analyses at 404-408 may be performed in parallel.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, and/or hardware.

Steps, operations, or processes described may be performed or implemented with one or more hardware or software modules, alone or in combination with other devices. In some embodiments, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations described. The apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A system comprising:
    one or more processors; and
    one or more non-transitory computer-readable media storing a plurality of instructions which, when executed by the one or more processors, cause the system to perform steps comprising:
        obtaining an image from one or more cameras coupled to a first vehicle, wherein obtaining the image is responsive to one or more non-camera sensors detecting an object outside the first vehicle;
        providing the image as input to a first machine learning algorithm, wherein the first machine learning algorithm is configured to determine whether or not the object depicted in the image corresponds to another vehicle and to determine size information and location information for the object;
        obtaining a set of features based on output from the first machine learning algorithm, wherein the set of features includes size information and location information for a second vehicle that is identified in the image;
        determining, based on the set of features, whether or not the second vehicle is depicted within a predetermined region of the image, wherein the predetermined region includes a predicted travel path of the first vehicle;
        determining, based on the set of features, whether or not the second vehicle is within a predetermined proximity of the first vehicle; and generating, based on determining whether or not the second vehicle is depicted within the predetermined region and based on determining whether or not the second vehicle is within the predetermined proximity, a first determination as to whether or not there is a significant risk of collision between the first vehicle and the second vehicle.

2. The system of claim 1, wherein the plurality of instructions further comprise instructions which, when executed by the one or more processors, cause the system to perform steps comprising: after obtaining the set of features based on the output from the first machine learning algorithm, providing the set of features as input to a second machine learning algorithm that is configured to generate a second determination as to whether or not there is a significant risk of collision between the first vehicle and the second vehicle; obtaining the second determination as output from the second machine learning algorithm; and performing an ensembling process on the first determination and the second determination to determine whether or not there is a significant risk of collision between the first vehicle and the second vehicle.

3. The system of claim 1, wherein the first machine learning algorithm is performed using a convolutional neural network.

4. The system of claim 1, wherein the predetermined region has a triangular shape.

5. The system of claim 1, wherein the size information comprises one or more dimension values of a bounding box that includes the second vehicle.

6. The system of claim 1, wherein the location information comprises a pair of coordinates corresponding to an approximate center of a bounding box that includes the second vehicle.

7. A method comprising:
obtaining an image from one or more cameras coupled to a first vehicle, wherein obtaining the image is responsive to one or more non-camera sensors detecting an object outside the first vehicle; providing the image as input to a first machine learning algorithm, wherein the first machine learning algorithm is configured to determine whether or not the object depicted in the image corresponds to another vehicle and to determine size information and location information for the object; obtaining a set of features based on output from the first machine learning algorithm, wherein the set of features includes size information and location information for a second vehicle that is identified in the image; determining, based on the set of features, whether or not the second vehicle is depicted within a predetermined region of the image, wherein the predetermined region includes a predicted travel path of the first vehicle; determining, based on the set of features, whether or not the second vehicle is within a predetermined proximity of the first vehicle; and generating, based on determining whether or not the second vehicle is depicted within the predetermined region and based on determining whether or not the second vehicle is within the predetermined proximity, a first determination as to whether or not there is a significant risk of collision between the first vehicle and the second vehicle, wherein the method is performed by one or more computing devices.

8. The method of claim 7, further comprising:
after obtaining the set of features based on the output from the first machine learning algorithm, providing the set of features as input to a second machine learning algorithm that is configured to generate a second determination as to whether or not there is a significant risk of collision between the first vehicle and the second vehicle; obtaining the second determination as output from the second machine learning algorithm; and performing an ensembling process on the first determination and the second determination to determine whether or not there is a significant risk of collision between the first vehicle and the second vehicle.

9. The method of claim 7, wherein the first machine learning algorithm is performed using a convolutional neural network.

10. The method of claim 7, wherein the predetermined region has a triangular shape.

11. The method of claim 7, wherein the size information comprises one or more dimension values of a bounding box that includes the second vehicle.

12. The method of claim 7, wherein the location information comprises a pair of coordinates corresponding to an approximate center of a bounding box that includes the second vehicle.

13. One or more non-transitory computer-readable media storing a plurality of instructions configured for execution by one or more processors, the plurality of instructions comprising:
obtaining an image from one or more cameras coupled to a first vehicle, wherein obtaining the image is responsive to one or more non-camera sensors detecting an object outside the first vehicle;
providing the image as input to a first machine learning algorithm, wherein the first machine learning algorithm is configured to determine whether or not the object depicted in the image corresponds to another vehicle and to determine size information and location information for the object;
obtaining a set of features based on output from the first machine learning algorithm, wherein the set of features includes size information and location information for a second vehicle that is identified in the image;
determining, based on the set of features, whether or not the second vehicle is depicted within a predetermined region of the image, wherein the predetermined region includes a predicted travel path of the first vehicle;
determining, based on the set of features, whether or not the second vehicle is within a predetermined proximity of the first vehicle; and
generating, based on determining whether or not the second vehicle is depicted within the predetermined region and based on determining whether or not the second vehicle is within the predetermined proximity, a first determination as to whether or not there is a significant risk of collision between the first vehicle and the second vehicle.

14. One or more non-transitory computer-readable media storing a plurality of instructions configured for execution by one or more processors, the plurality of instructions comprising:
providing an image as input to a first machine learning algorithm, wherein the image is obtained from one or more cameras coupled to a first vehicle, wherein the first machine learning algorithm is configured to determine whether or not an object depicted in the image corresponds to another vehicle and to determine size information and location information for the object;
obtaining a set of features based on output from the first machine learning algorithm, wherein the set of features includes size information and location information for a second vehicle that is identified in the image;

determining, based on the set of features, whether or not the second vehicle is depicted within a predetermined region of the image, wherein the predetermined region includes a predicted travel path of the first vehicle;

determining, based on the set of features, whether or not the second vehicle is within a predetermined proximity of the first vehicle;

generating, based on determining whether or not the second vehicle is depicted within the predetermined region and based on determining whether or not the second vehicle is depicted within the predetermined region and based on determining whether or not the second vehicle is within the predetermined proximity, a first determination as to whether or not there is a significant risk of collision between the first vehicle and the second vehicle;

providing the set of features as input to a second machine learning algorithm that is configured to generate a second determination as to whether or not there is a significant risk of collision between the first vehicle and the second vehicle;

obtaining the second determination as output from the second machine learning algorithm; and performing an ensembling process on the first determination and the second determination to determine whether or not there is a significant risk of collision between the first vehicle and the second vehicle.

15. The one or more non-transitory computer-readable media of claim 13, wherein the first machine learning algorithm is performed using a convolutional neural network.

16. The one or more non-transitory computer-readable media of claim 13, wherein the predetermined region has a triangular shape.

17. The one or more non-transitory computer-readable media of claim 13, wherein the size information comprises one or more dimension values of a bounding box that includes the second vehicle.

18. The one or more non-transitory computer-readable media of claim 13, wherein the location information comprises a pair of coordinates corresponding to an approximate center of a bounding box that includes the second vehicle.

* * * * *